(12) United States Patent
Ishida et al.

(10) Patent No.: US 9,187,804 B2
(45) Date of Patent: Nov. 17, 2015

(54) LITHIUM RECOVERY METHOD

(75) Inventors: Hitoshi Ishida, Niihama (JP); Satoshi Asano, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 14/375,896

(22) PCT Filed: Feb. 3, 2012

(86) PCT No.: PCT/JP2012/052537
§ 371 (c)(1),
(2), (4) Date: Jul. 31, 2014

(87) PCT Pub. No.: WO2013/114621
PCT Pub. Date: Aug. 8, 2013

(65) Prior Publication Data
US 2014/0377154 A1  Dec. 25, 2014

(51) Int. Cl.
| | |
|---|---|
| C22B 26/00 | (2006.01) |
| C22B 26/12 | (2006.01) |
| C22B 7/00 | (2006.01) |
| C22B 3/26 | (2006.01) |
| H01M 10/54 | (2006.01) |
| C22B 3/44 | (2006.01) |
| H01M 10/0525 | (2010.01) |

(52) U.S. Cl.
CPC ............... *C22B 26/12* (2013.01); *C22B 3/0005* (2013.01); *C22B 3/44* (2013.01); *C22B 7/006* (2013.01); *C22B 7/007* (2013.01); *H01M 10/0525* (2013.01); *H01M 10/54* (2013.01); *Y02W 30/54* (2015.05); *Y02W 30/84* (2015.05)

(58) Field of Classification Search
None
See application file for complete search history.

(56) References Cited

U.S. PATENT DOCUMENTS

2011/0072936 A1   3/2011  Narisako et al.

FOREIGN PATENT DOCUMENTS

| JP | A-7-207349 | 8/1995 |
|---|---|---|
| JP | A-8-22846 | 1/1996 |
| JP | A-10-330855 | 12/1998 |
| JP | A-2003-157913 | 5/2003 |
| JP | A-2007-122885 | 5/2007 |
| JP | A-2011-74410 | 4/2011 |
| JP | A-2012-41621 | 3/2012 |

OTHER PUBLICATIONS

Partial translation of JP-2007-122885, May 2007.*
International Search Report issued in International Application No. PCT/JP2012/052537 mailed Apr. 24, 2012.

* cited by examiner

*Primary Examiner* — Steven Bos
(74) *Attorney, Agent, or Firm* — Oliff PLC

(57) ABSTRACT

To provide a lithium recovery method which is capable of efficiently recovering lithium without containing impurities, such as phosphorus and fluorine. In the present invention, an alkali is added to a discharge liquid and/or a cleaning liquid containing lithium discharged in a process of recovering valuable metals from a lithium ion battery, an acidic solvent extractant is caused to be in contact with the discharge liquid and/or the cleaning liquid under a condition of pH 9 or less and a temperature of 0 to 25° C. and lithium ions are extracted, and the acidic solvent extractant having extracted the lithium ions is caused to be in contact with an acid solution of pH 3 or less and the lithium ions are stripped.

4 Claims, 1 Drawing Sheet

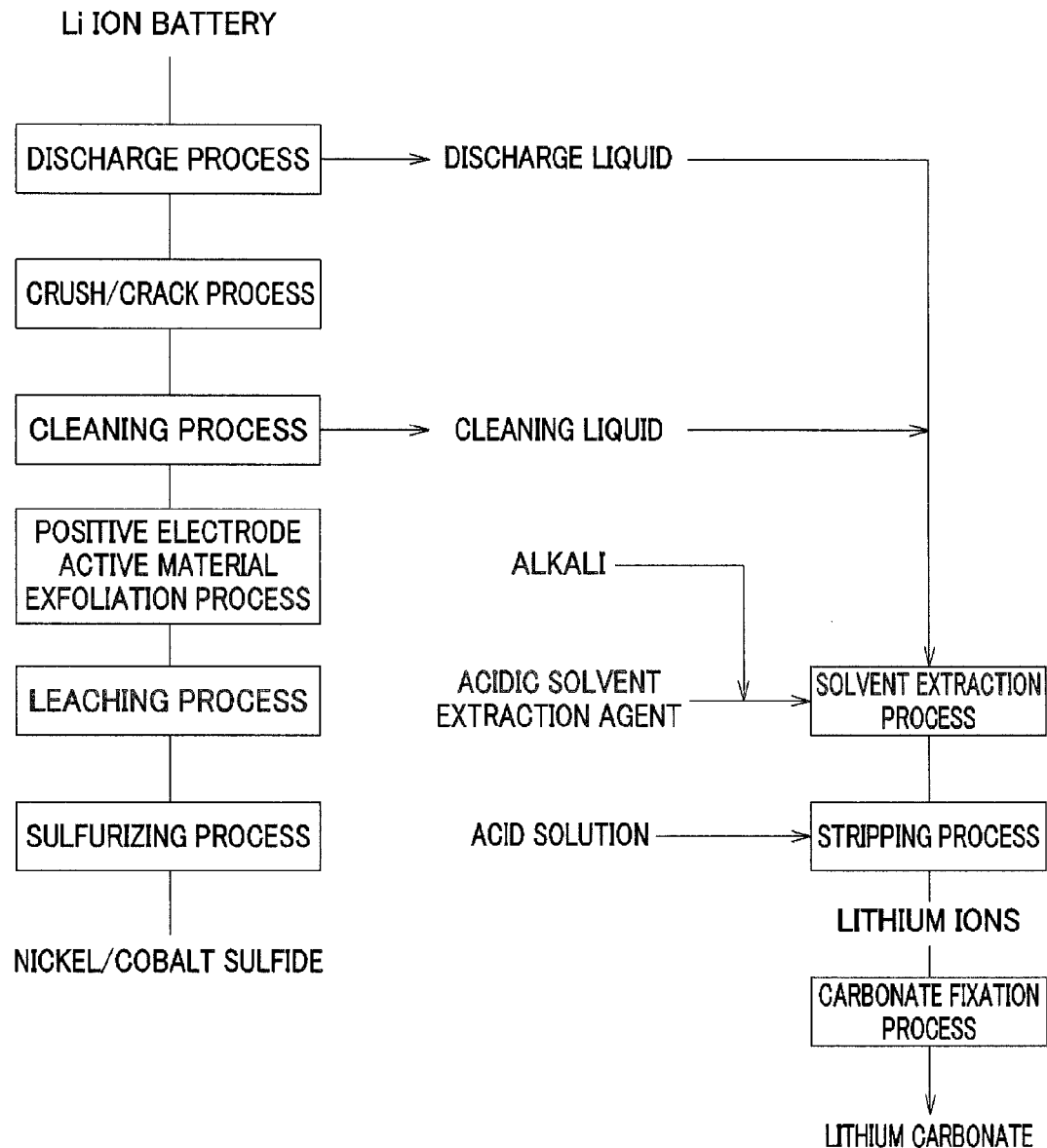

LITHIUM RECOVERY METHOD

TECHNICAL FIELD

The present invention relates to a lithium recovery method, and especially relates to a lithium recovery method, which is capable of efficiently recovering lithium contained in a discharge liquid and a cleaning liquid discharged in a process of recovering valuable metals from a lithium ion battery.

BACKGROUND ART

Effective use of electric power is required for recent global warming tendency. Secondary batteries for power storage are expected as one means, and from the standpoint of prevention of air pollution, early practical application of large secondary batteries is expected as an automobile power source. Further, a demand of small secondary batteries has been steadily increasing especially in association with spread and performance enhancement of electrical devices, such as digital cameras and mobile phones, as back-up sources of computers and power sources of small household electrical appliances.

As these secondary batteries, a secondary battery having performance corresponding to a device to be used is required, and typically, lithium ion batteries are mainly used.

In the lithium ion battery, a negative electrode material formed such that a negative electrode active material of graphite, or the like is fixed to a negative electrode substrate made of copper foil in a metal packaging can of aluminum, iron, or the like, a positive electrode material formed such that a positive electrode material of lithium nickel oxide, lithium cobalt oxide, or the like is fixed to a positive electrode substrate made of aluminum foil, a current collector made of aluminum or copper, a separator made of resin film, such as a polypropylene porous film, an electrolyte solution, an electrolyte, and the like are enclosed.

By the way, establishment of measures against environment pollution with used lithium ion batteries is strongly required for the expanding demand of lithium ion batteries, and recovery and effective use of valuable metals have been examined.

As a method of recovering valuable metals from a lithium ion battery provided with the above-described structure, dry treatment or incineration treatment described in Patent Literatures 1 and 2 are used. However, these methods have such drawbacks that consumption of thermal energy is large, lithium and aluminum cannot be recovered.

Furthermore, as described in Patent Literatures 3 and 4, methods of recovering valuable metals by wet treatment have been proposed. However, in such methods in which a wet treatment is used, dry treatment is partly used and keeping the costs of such methods low is difficult because of complexity of a treatment process. Therefore, the valuable metals cannot be efficiently recovered.

In particular with respect to lithium as a valuable metal, there is also a problem that impurities, such as phosphorus and fluorine, are mixed in, and thus high-quality lithium cannot be efficiently recovered in the form of a simple substance. Namely, a lithium ion battery contains, as an electrolyte, lithium hexafluorophosphate ($LiPF_6$) and the like, which comprises a valuable metal (lithium). $LiPF_6$ may undergo a hydrolysis reaction through wet treatment, and form a precipitate in the forms of lithium phosphate and lithium fluoride, and thus lithium cannot be efficiently recovered in the form of a simple substance.

CITATION LIST

Patent Literature

Patent Literature 1: JP 07-207349 A
Patent Literature 2: JP 10-330855 A
Patent Literature 3: JP 08-22846 A
Patent Literature 4: JP 2003-157913 A

SUMMARY OF INVENTION

Technical Problem

Accordingly, the present invention has been proposed in view of the foregoing, and the objective is to provide a lithium recovery method, which is capable of efficiently recovering lithium without containing impurities, such as phosphorus and fluorine.

Solution to Problem

As a result of keen examination for achievement of the above objective, the inventors have found out that they can recover lithium that is a valuable metal in a form of not mixing in impurities, such as phosphorus and fluorine, by performing solvent extraction treatment to allow an acidic solvent extractant to be in contact with and stirred with a discharged liquid and/or a cleaning liquid discharged in a process of recovering valuable metals from a lithium ion battery under a low temperature condition, and have completed the present invention.

That is, the present invention includes: an extraction process of adding an alkali to a discharge liquid and/or a cleaning liquid containing lithium discharged in a process of recovering valuable metals from a lithium ion battery, and allowing an acidic solvent extractant to be in contact with the discharge liquid and/or the cleaning liquid under a condition of pH 9 or less and a temperature of 0 to 25° C. to extract lithium ions; and a stripping process of allowing the acidic solvent extractant having extracted the lithium ions in the extraction process to be in contact with an acid solution of pH 3 or less to strip the lithium ions.

Advantageous Effects of Invention

According to the present invention, by effectively suppressing a hydrolysis reaction of $LiPF_6$ and the like, lithium without containing impurities, such as phosphorus and fluorine, can be efficiently recovered.

BRIEF DESCRIPTION OF DRAWINGS

FIG. 1 is a diagram illustrating a process of recovering lithium by solvent extraction treatment from a discharge liquid and/or a cleaning liquid discharged in a process of recovering valuable metals from a lithium ion battery.

DESCRIPTION OF EMBODIMENTS

Hereinafter, a lithium recovery method according to the present invention will be described in detail in the following order with reference to the drawing.
1. An outline of the present invention
2. A method of recovering valuable metals from a lithium ion battery
   2-1. Recovery of nickel and cobalt 2-2. Recovery of lithium
3. Other embodiments
4. Examples

1. An Outline of the Present Invention

The present invention is a lithium recovery method that is a valuable metal from a lithium ion battery, and is a method of preventing mixing in of impurities, such as phosphorus (P) and fluorine (F), and efficiently recovering lithium contained in a discharge liquid or a cleaning liquid discharged in a process of recovering valuable metals from a lithium ion battery.

In recovering valuable metals from a lithium ion battery, treatment to discharge a used lithium ion battery using the discharge liquid and treatment to clean dismantled objects of the battery using the cleaning liquid are performed. The discharge liquid and the cleaning liquid after the treatment contain lithium in the form of $LiPF_6$, or the like, which is a component of an electrolyte that constitutes the lithium ion battery. Therefore, it is desirable to efficiently recover lithium from process liquids, such as the discharge liquid and the cleaning liquid, and to reuse recovered high-quality lithium as a component of the electrolyte.

However, a hydrolysis reaction is caused in $LiPF_6$ under a temperature condition higher than room temperature, a precipitate of a phosphate ($Li_3PO_4$) and a fluoride (LiF) is formed. Therefore, even if a precipitate of a lithium carbonate is intended to be formed by adding of a water-soluble carbonate and the like to the discharge liquid and the cleaning liquid, the precipitate contains a large amount of phosphorus and fluorine. Such lithium is contaminated by phosphorus and fluorine, and thus cannot be used as a component of a positive electrode material again.

Therefore, in the present invention, an alkali is added to the discharge liquid and/or the cleaning liquid discharged in a process of recovering valuable metals from a lithium ion battery, an acidic solvent extractant is caused to be in contact with the discharge liquid and/or the cleaning liquid under a condition of pH 9 or less and a low temperature of 0 to 25° C. and lithium ions are extracted, and the lithium ions are taken in to a solution by stripping of the acidic solvent extractant having extracted the lithium ions to be in contact with an acid solution of pH 3 or less. As described above, in the present invention, solvent extraction treatment is performed using an acidic solvent extractant under a condition of pH 9 or less and a low temperature of 0 to 25° C. Therefore, hydrolysis of $LiPF_6$ is suppressed, and lithium of high-purity without mixing in phosphorus and fluorine can be recovered.

Hereinafter, an embodiment (hereinafter, referred to as "present embodiment") related to a method of recovering valuable metals from a lithium ion battery, to which the present invention is applied, will be further described in detail.

2. A Method of Recovering Valuable Metals from a Lithium Ion Battery

First, a method of recovering valuable metals from a lithium ion battery according to the present embodiment will be herein described with reference to the process diagram illustrated in FIG. 1. As illustrated in FIG. 1, the method of recovering valuable metals includes a discharge process, a crush/crack process, a cleaning process, a positive electrode material exfoliation process, a leaching process, and a sulfurizing process. Further, as a lithium recovery method, a solvent extraction process to perform solvent extraction using the discharge liquid and/or the cleaning liquid respectively discharged from the discharge process and the cleaning process, and a stripping process to strip the lithium ions from an extraction liquid are included. Hereinafter, a process of recovering nickel and cobalt from a lithium ion battery, and a process of recovering lithium from a discharge liquid and a cleaning liquid discharged in the process of recovering nickel and cobalt will be described.

<2-1. Recovery of Nickel and Cobalt>
(Discharge Process)

In the discharge process, when valuable metals are recovered from a used lithium ion battery, the battery is discharged prior to dismantlement of the used battery. Since it is dangerous if the battery is in a charged state when dismantled by being crushed and cracked in the crush/crack process described below, the battery is discharged and is made harmless.

In the discharge process, a discharge liquid, such as a sodium sulfate solution or a sodium chloride solution, is used, and the used battery is discharged by being immersed in the solution. The discharge liquid is discharged after the discharge treatment. In the discharged discharge liquid, components of an electrolyte and an electrolyte solution that constitute the lithium ion battery are liquated in association with the discharge treatment. That is, the discharged liquid after the treatment, which contains lithium of the electrolyte, the electrolyte solution, and the like, is discharged.

(Crush/Crack Process)

In the crush/crack process, the used lithium ion battery that has been discharged and made harmless is dismantled by being crushed and cracked.

In the crush/crack process, the harmless battery is dismantled into an appropriate size using a normal crusher or cracking machine. Further, the packaging can is cut off and the internal positive electrode material and negative electrode material can be separated and dismantled. However, it is desirable to cut off separated portions into a more appropriate size.

(Cleaning Process)

In the cleaning process, the electrolyte solution and the electrolyte are removed by cleaning of the dismantled objects of the battery obtained through the crush/crack process with water or alcohol. The lithium ion battery contains organic solvents, such as ethylene carbonate, propylene carbonate, diethyl carbonate, and dimethyl carbonate, and the electrolyte, such as lithium hexafluorophosphate ($LiPF_6$). Therefore, by removing of the organic solvents and the electrolyte in advance, organic components, phosphorus (P), and fluorine (F) are prevented from being mixed in the leachate as impurities in the positive electrode material exfoliation process described below.

Water or alcohol is used for cleaning of the dismantled objects of the battery, and the organic components and the electrolyte are removed by being shaken or stirred. As the alcohol, ethanol, methanol, isopropyl alcohol, or a mixed liquid thereof is used. While carbonates are typically insoluble to water, ethylene carbonate that is a component of the electrolyte solution is arbitrarily dissolved in water, and other organic components have some solubility to water. Therefore, carbonates can be cleaned with water.

It is desirable to clean the dismantled objects of the battery a plurality of times, and phosphorus, fluorine, and the like derived of the organic components and the electrolyte are removed by the cleaning process to an extent not to influence subsequent processes.

In the cleaning process, the electrolyte solution and the electrolyte contained in the battery are removed by the cleaning using water or alcohol described above. Therefore, the cleaning liquid containing the electrolyte of $LiPF_6$ and the like, and an electrolyte solution of ethylene carbonate and diethyl carbonate is discharged after the treatment. That is, a cleaning liquid after the treatment, which contains components containing lithium of the electrolyte, the electrolyte solution, and the like, is discharged.

(Positive Electrode Material Exfoliation Process)

In the positive electrode material exfoliation process, a positive electrode material is exfoliated and separated from a positive electrode substrate by immersing the dismantled objects of the battery obtained through the cleaning process in an acid solution, such as a sulfuric acid aqueous solution, an alkali solution, or a solution that contains surfactant. In this process, the positive electrode material and aluminum foil can be separated in a solid state by putting and stirring the dismantled objects of the battery in an acid solution, such as a sulfuric acid aqueous solution, or a surfactant solution. Note that, in this process, all of the dismantled objects of the battery may be immersed in the sulfuric acid aqueous solution or the surfactant solution, meanwhile, only a positive electrode material portion is selected from the dismantled objects of the battery, and may be immersed.

When a sulfuric acid aqueous solution is used as the acid solution, pH of the solution is controlled to fall within a range of pH 0 to 3. An input amount of the dismantled objects of the battery to the sulfuric acid aqueous solution is 10 to 100 g/l. As the alkali solution, a sodium hydroxide solution, or the like can be used, and its additive amount is 0.3 to 1.0 N. Further, when the surfactant-containing solution is used, the type of surfactant is not especially limited, and nonionic surfactant, anionic surfactant, or the like can be used. An additive amount of the surfactant is 1.5 to 10 weight %, and pH of the surfactant solution desirably falls within a range of pH 5 to 9.

The dismantled objects of the battery having been subjected to the positive electrode material exfoliation process are screened, and a positive electrode material of lithium nickel oxide, lithium cobalt oxide, and the like separated from the positive electrode substrate, and things accompanying thereto are recovered. When all of the dismantled objects of the battery are processed, negative electrode powder, such as graphite, which is a negative electrode material, and things accompanying thereto are also recovered. Meanwhile, portions of the positive electrode substrate and the negative electrode substrate, a portion of the packaging can made of aluminum, iron, and the like, a portion of the separator made of resin film, such as a polypropylene porous film, a portion of the current collector made of aluminum or copper (Cu), and the like are separated and supplied to respective treatment processes.

In the positive electrode material exfoliation process, by exfoliating of the positive electrode material from the dismantled objects of the battery using the acid solution or the surfactant-containing solution, solid portions, such as the positive electrode material and the aluminum foil, are separated. Meanwhile a process liquid other than the solid portions, such as the acid solution, the alkali solution, or the surfactant solution used in the exfoliation treatment, is discharged as filtrate. In the filtrate, the electrolyte, the electrolyte solution, and the like that have not been removed in the cleaning process may be dissolved and contained.

(Leaching Process)

In the leaching process, the positive electrode material exfoliated and recovered in the positive electrode material exfoliation process is leached in an acid solution and is made into slurry, in the presence of a fixed carbon-containing material, a metal having high reduction effect, or the like. By the leaching process, the positive electrode material is dissolved in an acid solution, and nickel, cobalt, and the like that are the valuable metals constituting the positive electrode material are made into metal ions.

As the acid solution used in dissolution of the positive electrode material, an organic acid can be used, in addition to a mineral acid, such as sulfuric acid, nitric acid, or hydrochloric acid. Further, the acid solution to be used has at least pH 2 or less, and it is desirable to control pH to about 0.5 to 1.5 in consideration of reactivity.

(Sulfurizing Process)

In the sulfurizing process, the solution obtained through the leaching process is introduced to a reaction container, and a sulfurizing agent is added, so that a sulfurizing reaction is caused, and nickel/cobalt mixed sulfide is generated. This allows recovery of nickel and cobalt that are the valuable metals from the lithium ion battery. As the sulfurizing agent, a sodium sulfide, a sodium hydrosulfide, or an alkali sulfide, such as a hydrogen sulfide gas, can be used.

To be specific, in the sulfurizing process, a nickel ion (or a cobalt ion) contained in the solution obtained through the leaching process become a sulfide by a sulfurizing reaction with an alkali sulfide according to a formula (1), (2) or (3).

$$Ni^{2+}+H_2S \Rightarrow NiS+2H^+ \qquad (1)$$

$$Ni^{2+}+NaHS \Rightarrow NiS+H^++Na^+ \qquad (2)$$

$$Ni^{2+}+Na_2S \Rightarrow NiS+2Na^+ \qquad (3)$$

Addition of the sulfurizing agent in the sulfurizing process is performed until a point of time when change of ORP in the reaction solution does not happen by addition of the sulfurizing agent. Note that, typically, the reaction is completed within a range of −200 to 400 mV (a reference electrode: silver/silver chloride electrode). Further, the solution used in the sulfurizing reaction has about pH 2 to 4. The temperature of the sulfurizing reaction is, but not especially limited to, 0 to 90° C., desirably about 25° C.

Note that in the formulae (1) and (2), an acid is generated as the reaction proceeds, and the reaction is delayed. Therefore, to facilitate and complete the reaction, it is desirable to add an alkali, such as sodium hydroxide, together with the sulfurizing agent, to neutralize the generated acid.

By causing of the sulfurizing reaction in the sulfurizing process, nickel and cobalt that are the valuable metals contained in the positive electrode material of the lithium ion battery can be recovered as a nickel/cobalt sulfide (sulfide precipitate).

As described above, when nickel and cobalt are recovered from the lithium ion battery, the discharge liquid used in the discharge treatment in the discharge process, and the cleaning liquid used for cleaning the dismantled objects of the battery and cleaning the electrolyte and the electrolyte solution in the cleaning process are discharged. The discharge liquid and the cleaning liquid discharged after the treatment contain the electrolyte, such as $LiPF_6$, which constitutes the lithium ion battery, and it is desirable to efficiently recover lithium without mixing in the impurities, such as phosphorus and fluorine from the discharge liquid and the cleaning liquid.

<2-2. Recovery of Lithium>

Therefore, in the present embodiment, solvent extraction treatment is performed by allowing the discharge liquid and/ or the cleaning liquid containing lithium discharged in a process of recovering valuable metals from a lithium ion battery to be in contact with an acidic solvent extractant while keeping the liquid(s) to a low temperature. Accordingly, the lithium ions can be efficiently extracted while $LiPF_6$ contained in the discharge liquid and the cleaning liquid after the treatment is prevented from being hydrolyzed to form a precipitate of $Li_3PO_4$ and LiF.

To be specific, the lithium recovery method in the present embodiment includes: an extraction process of adding an alkali to a discharge liquid and/or a cleaning liquid containing lithium discharged in a process of recovering valuable metals from a lithium ion battery, and allowing an acidic solvent extractant to be in contact with the discharge liquid and/or the cleaning liquid under a condition of pH 9 or less and a temperature of 0 to 25° C. to extract lithium ions; and a stripping process of allowing the acidic solvent extractant obtained in the extraction process to be in contact with an acid solution of pH 3 or less to strip the lithium ions.

(Solvent Extraction Process)

In the solvent extraction process, the lithium ions are extracted from the discharge liquid and/or the cleaning liquid discharged in the process of recovering valuable metals from a lithium ion battery by the solvent extraction treatment. In the present embodiment, especially, solvent extraction is performed from the discharge liquid and/or the cleaning liquid using an acidic solvent extractant under a low temperature condition.

The discharge liquid that is an object to be subjected to the solvent extraction is a discharge liquid used for the discharge treatment when the valuable metals are recovered from a lithium ion battery, and is a solution of a sodium chloride, a sodium sulfate, or the like. By performing the discharge treatment to a used lithium ion battery using the discharge liquid, the discharge liquid discharged after the discharge treatment contains electrolyte components, such as $LiPF_6$ that constitute the lithium ion battery. That is, lithium is contained in the discharged liquid after the treatment.

Further, the cleaning liquid that is to be subjected to the solvent extraction is, as described above, a cleaning liquid used for cleaning the dismantled objects of the battery after the used lithium ion battery is crushed/cracked, and is a solution of water, alcohol, or the like. Cleaning the dismantled objects of the battery using the cleaning liquid removes the electrolyte and the electrolyte solution contained in the dismantled objects of the battery. The cleaning liquid that is discharged after the treatment contains the electrolyte components, such as $LiPF_6$. That is, lithium is contained in the cleaning liquid after the treatment.

The solvent extraction treatment may be performed using these discharge liquid and cleaning liquid as they are after recovery. However, stripping treatment may be performed using water prior to the solvent extraction treatment. That is, treatment to clean the discharge liquid and the cleaning liquid after recovery with water may be performed. As described above, firstly, stripping the recovered discharged liquid and cleaning liquid with water, a precipitate of suspended $Li_3PO_4$, LiF, and the like can be cleaned and removed. Accordingly, the recovered lithium can be effectively prevented from being contaminated by phosphorus and fluorine, and the precipitate can be prevented from being an obstacle when lithium is recovered, whereby lithium can be more efficiently recovered.

As the acidic solvent extractant, 2-ethylhexyl phosphonic acid mono-2-ethylhexyl, di(2-ethylhexyl)phosphonic acid, bis(2,4,4 trimethylpentyl)phosphonic acid, a mixture of phenyl alkyl beta-diketone and trioctylphosphine oxide, or the like can be used, for example. Among them, it is especially desirable to use di(2-ethylhexyl)phosphonic acid that can perform extraction under a condition of weak alkali. $LiPF_6$ has a decomposition reaction even in an alkaline environment, and forms a precipitate of a phosphate and a fluoride. Therefore, it is desirable to efficiently perform extraction under a low pH condition.

As an alkali added in the solvent extraction process, a sodium hydroxide, a potassium hydroxide, a calcium hydroxide, a magnesium hydroxide, or the like can be used. In the solvent extraction process, by adding of these alkalis, the discharge liquid and/or the cleaning liquid containing lithium are/is adjusted to have pH 9 or less, more desirably pH 4 to 9, and the solvent extraction treatment is performed using the acidic solvent extractant. By adjusting of the liquid to have pH 9 or less in this way, the decomposition reaction of $LiPF_6$ is effectively suppressed, and the solvent extraction treatment can be performed.

The acidic solvent extractant used in the solvent extraction process has a characteristic of extracting metal ions in an alkaline region, causing ion exchange with $H^+$ by causing pH to an acid side after the extraction, and releasing the extracted metal ions. Therefore, in the present embodiment, by allowing the acidic solvent extractant that has extracted the lithium ions in an alkaline region by addition of an alkali to be in contact with a solution adjusted to be acidic, the lithium ions can be stripped in the solution with a concentration higher than that of the first extracted lithium-containing solution (about several g/l). Especially, in the present embodiment, by performing the solvent extraction treatment under a condition of pH 9 or less, as described above, the lithium ions can be efficiently extracted while the decomposition reaction of $LiPF_6$ is effectively suppressed.

Further, in the present embodiment, the solvent is extracted from the discharge liquid and/or the cleaning liquid in the solvent extraction process under a low temperature condition of 0 to 25° C. More desirably, the solvent is extracted under a temperature condition of 0 to 20° C. Since the hydrolysis reaction is advanced in $LiPF_6$ in a high-temperature state, by performing the solvent extraction while maintaining the low temperature of 0 to 25° C., the hydrolysis reaction of $LiPF_6$ can be further effectively suppressed. Accordingly, formation of a precipitate of $Li_3PO_4$ and LiF can be prevented, and lithium ions without having contamination by phosphorus and fluorine can be extracted.

(Stripping Process)

In the stripping process, by allowing the acidic solvent extractant that has performed extraction in the solvent extraction process to be in contact with an acid solution having pH 3 or less and stripping the lithium ions, the lithium ions are taken in to the solution.

In the stripping process, by adjusting pH of the acidic solvent extractant used in the solvent extraction process to be an acid side, ion exchange with $H^+$ is caused, and the metal ions are released and taken in to the solution.

Further, in the stripping process, $LiPF_6$ extracted together with the lithium ions in the extraction process is decomposed, and a larger amount of lithium ions are stripped and are taken in to the solution. That is, in the solvent extraction process, the lithium ions are extracted by performing the extraction treatment using the acidic solvent extractant. At this time, $LiPF_6$ is extracted in the extractant together with the lithium ions due to influence of entrainment. In the solvent extraction treatment, the hydrolysis of $LiPF_6$ is prevented under the low temperature condition of 0 to 25° C. Therefore, the remained $LiPF_6$ is extracted together with the lithium ions. Therefore, in the stripping process, by cleaning of an extractant with an acid solution, the extracted $LiPF_6$ is separated into $Li^+$ and $PF_6^-$, and only the lithium ions are stripped.

In the present embodiment, by allowing the acidic solvent extractant that has performed extraction treatment in the extraction process to be in contact with the acid solution, a solution containing lithium ions are obtained and a compound containing phosphorus and fluorine is effectively decomposed, and a lithium ion-containing solution having high concentration can be obtained.

As the acid solution, a sulfuric acid solution, a hydrochloric acid solution, or the like can be used, and the acid solution is adjusted to have pH 3 or less, and is allowed to be in contact with the acidic solvent extractant.

Further, in the stripping process, it is desirable to perform the stripping treatment under a low temperature condition of 0 to 25° C. By performing the extraction treatment and the stripping treatment while keeping the temperature condition to the low temperature of 0 to 25° C., the extracted $LiPF_6$ can be prevented from being hydrolyzed to form a precipitate of $Li_3PO_4$ and LiF.

As described above, in the stripping process, the extracted lithium ions can be taken in to the solution by allowing of the acidic solvent extractant that has extracted the lithium ions from the discharge liquid and/or the cleaning liquid containing lithium in the extraction process to be in contact with the acid solution of pH 3 or less. Further, $LiPF_6$ extracted together with the lithium ions can be separated into $Li^+$ and $PF_6^-$, and the lithium ions can be taken in to the solution with higher concentration while the contamination by phosphorus and fluorine is prevented.

Note that, in the stripping process, by repeating the stripping operation iteratively using the stripping side solution, the concentration of the lithium ions in the solution can be concentrated. Further, an extraction rate and a stripping rate can be controlled by accurately controlling of pH, and final lithium ion concentration in the solution can be controlled.
(Carbonate Fixation Process)

Note that a carbon dioxide gas or a water-soluble carbonate is added to, and mixed and stirred with the stripping liquid containing the lithium ions obtained in the stripping process, and a lithium carbonate may be deposited. In this way, by adding a carbonate dioxide gas or a water-soluble carbonate to the extraction liquid including lithium ions as a carbonate fixation process, the extracted lithium can be recovered as a solid.

As the water-soluble carbonate, a sodium carbonate solution or a calcium carbonate solution, or the like can be used. Further, the concentration of the solution carbonate is 100 to 200 g/l.

In the lithium carbonate deposition process, the temperature of the stripping liquid containing the lithium ions is desirably 60 to 80° C. The lithium carbonate that is a carbonate of lithium has a different solubility from other salts, and when the temperature of the solution becomes higher, the solubility drastically decreases. Therefore, by increasing the temperature of a high-concentration lithium ion solution to 60° C. or more, the solubility of the lithium carbonate becomes lower than other salts, such as sodium sulfate having high solubility, and thus the lithium carbonate can be selectively precipitated as a crystal, and a lithium carbonate solid of high purity can be obtained. Note that it is better that the temperature of the high-concentration lithium ion solution be higher. However, when the temperature becomes higher than 80° C., typically, an operation becomes difficult from the viewpoint of heat resistance of a reaction vessel or peripheral devices, and the cost is increased. Therefore, the temperature is desirably set to 60 to 80° C.

3. Other Embodiments

The present invention is not limited to the above-described embodiments, and can be appropriately changed within a scope not to change the gist of the present invention.

To be specific, processes of recovering valuable metals from a lithium ion battery are not limited to the above processes, and may include other processes.

Further, the solvent extraction treatment may be performed including filtrate discharged from the positive electrode material exfoliation process together with the discharged liquid and the cleaning liquid after the treatment described above, and lithium may be recovered. That is, in the positive electrode material exfoliation process, while solid portions, such as a positive electrode material and aluminum foil, are separated, process liquids, such as an acid solution used in the exfoliation treatment and a surfactant solution, other than the solid portions, are discharged as the filtrate. In the filtrate, an electrolyte, an electrolyte solution, and the like that have not been removed in the cleaning process may sometimes be dissolved and contained. Therefore, the lithium recovery treatment may be performed using the filtrate as an object to be subjected to the solvent extraction.

EXAMPLES

4. Examples

Hereinafter, the present invention will be described using examples. However, the present invention is not limited to the examples.
(A Process of Recovering Valuable Metals from a Lithium Ion Battery)

First, to avoid danger of combustion, and the like, in the treatment, a used lithium ion battery was immersed in a sodium chloride (NaCl) solution of 100 g/L, which is a discharge liquid, and was made to be in a discharge state. After the discharge treatment, a discharged discharge liquid was recovered. Then, the discharged lithium ion battery was dismantled into a size of 1 cm square or less by a biaxial crusher, and dismantled objects of the battery were obtained.

Next, the obtained dismantled objects of the battery were cleaned with water, and an electrolyte solution and an electrolyte contained in the dismantled objects of the battery were removed. After the cleaning treatment, the cleaning liquid (water) containing an electrolyte and an electrolyte solution was discharged.

Meanwhile, water containing 1.8 weight % of polyoxyethylene octylphenylether (EMULGEN series manufactured by Kao Corporation), which is surfactant, was added to solid portions separated with a screen from the dismantled objects of the battery of post-cleaning treatment. An exfoliation operation by stirring was performed, and a positive electrode material was recovered.

The exfoliated positive electrode material was leached in a sulfuric acid ($H_2SO_4$) solution, and nickel and cobalt that are the valuable metals were leached. A sodium sulfide ($Na_2S$) was added to the obtained leachate as a sulfurizing agent, and a nickel and a cobalt mixed sulfide were obtained.
(A Lithium Recovery Operation from a Discharge Liquid and a Cleaning Liquid)

Example 1

In the above-described operation of recovering valuable metals from a used lithium ion battery, the discharge liquid used in the discharge treatment and the cleaning liquid used in the cleaning treatment were discharged after the treatment processes.

Since these discharged liquid and cleaning liquid after the treatment contain lithium derived from a compound that constitutes an electrolyte, the solvent extraction treatment of a mixed liquid of the discharge liquid and the cleaning liquid was performed using di(2-ethylhexyl)phosphoric acid (D2EHPA, manufactured by Bayer AG), In the solvent extraction treatment, an 8 mol/l sodium hydroxide solution was added to the process liquids, and the extraction process liquid was adjusted to have pH 8. Further, the temperature was adjusted to 20° C.

After the solvent extraction, D2EHPA that is an extractant was in contact with and mixed with a sulfuric acid solution that has been adjusted to have pH 3, and the stripping treatment was performed. Note that the temperature was adjusted to 20° C.

A sodium carbonate solution having the concentration of 200 g/l was dropped to and mixed with a sulfuric acid lithium solution obtained by the stripping operation, the temperature was adjusted to 60° C., and a crystal of a lithium carbonate was deposited.

When analyzing the obtained crystal of a lithium carbonate, components other than lithium were 1% or less, and components of phosphorus and fluorine were a lower detection limit (1 mg/l) or less.

Comparative Example 1

A sodium carbonate solution was directly added to a mixed liquid of a discharge liquid and a cleaning liquid containing lithium discharged in the operation of recovering valuable metals from a used lithium ion battery, and a precipitate was formed.

When analyzing the obtained precipitate, a substantial amount of phosphorus and fluorine was contained, and only contaminated lithium was recovered, which did not satisfy the grade that can be used for manufacturing a positive electrode material again.

The invention claimed is:

1. A lithium recovery method comprising:
    an extraction process of cleaning, with water, a discharge liquid and/or a cleaning liquid containing lithium discharged in a process of recovering valuable metals from a lithium ion battery, adding an alkali to the cleaned discharge liquid and/or the cleaned cleaning liquid, and contacting an acidic solvent extractant with the discharge liquid and/or the cleaning liquid, which has had the alkali added thereto, under an alkaline pH condition where the alkaline pH condition is an alkaline pH of up to 9, and a temperature of 0 to 25° C. to extract lithium ions; and
    a stripping process of contacting the acidic solvent extractant having the extracted lithium ions with an acid solution of pH 3 or less to strip the lithium ions.

2. The lithium recovery method according to claim 1, wherein a temperature condition of the stripping process is 0 to 25° C.

3. The lithium recovery method according to claim 1, wherein the acidic solvent extractant is di(2-ethylhexyl)phosphoric acid.

4. The lithium recovery method according to claim 1, further comprising a lithium carbonate deposition process of adding a carbon dioxide gas or a water-soluble carbonate to a stripping liquid containing the lithium ions obtained in the stripping process, and depositing a lithium carbonate.

* * * * *